United States Patent [19]

Takayanagi et al.

[11] Patent Number: 5,630,945
[45] Date of Patent: May 20, 1997

[54] METHOD FOR RECOVERING UNCROSSLINKED SYNTHETIC RESIN WASTE

[75] Inventors: Yasuyuki Takayanagi; Satoshi Endoh; Naoki Sugama, all of Kanagawa; Masaru Sugita, Tokyo, all of Japan

[73] Assignee: Nitto Chemical Industry Co., Ltd., Tokyo, Japan

[21] Appl. No.: 517,760

[22] Filed: Aug. 22, 1995

[30] Foreign Application Priority Data

Aug. 24, 1994 [JP] Japan .................... 6-222670

[51] Int. Cl.$^6$ .................................................... B01D 11/04
[52] U.S. Cl. ........................ 210/773; 210/192; 210/251
[58] Field of Search ........................... 210/192, 773, 210/634, 251; 585/241

[56] References Cited

U.S. PATENT DOCUMENTS 5,409,737   4/1995   Kozak et al. ........................ 427/435

FOREIGN PATENT DOCUMENTS

| 51-28175 | 3/1976 | Japan | B29C 29/00 |
| 5-500186 | 1/1993 | Japan | B01D 11/08 |
| 6-32938  | 2/1994 | Japan | C08J 11/08 |

Primary Examiner—Frank Spear
Attorney, Agent, or Firm—Sughrue, Mion, Zinn, Macpeak & Seas

[57] ABSTRACT

A method for recovering an uncrosslinked synthetic resin waste including dissolving the uncrosslinked synthetic resin waste in a solvent containing, as an active ingredient, one or more oxyisobutyric acid esters selected from an alkyl α-alkoxyisobutyrate, an alkyl β-alkoxyisobutyrate and an alkyl α-hydroxyisobutyrate. This invention provides a method for recovering a plastic waste by using a highly safe solvent which is free from the problems encountered in the conventional methods with the use of aromatic hydrocarbons or halogenated hydrocarbons, and comprises non-halogen solvents, forms no substance causing environmental problems, has a high ability to dissolve plastic wastes, has neither toxicity nor any offensive odor, is not accumulated in nature because of its high biodegradability, and has a relatively high boiling point.

11 Claims, 1 Drawing Sheet

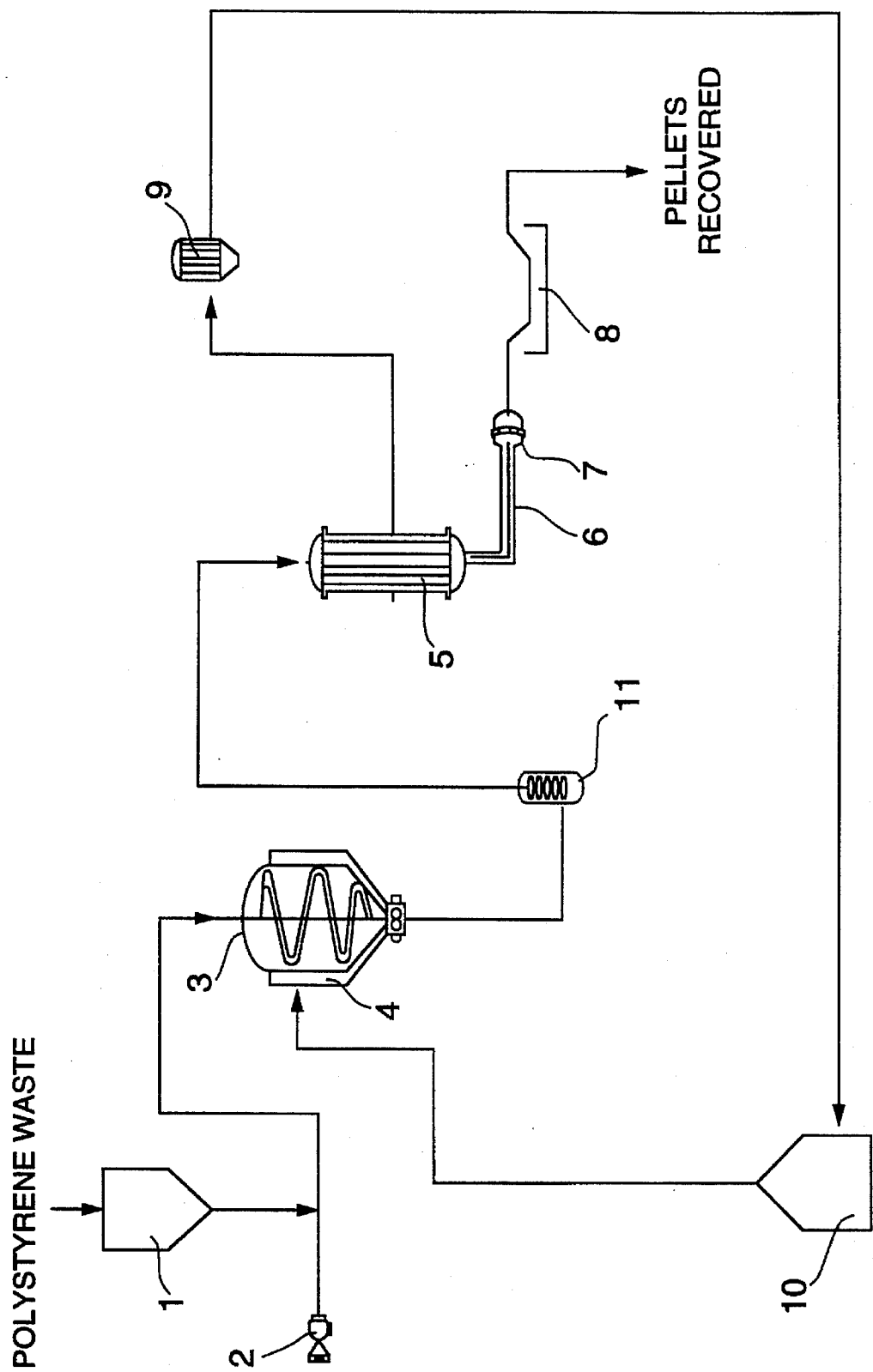

METHOD FOR RECOVERING UNCROSSLINKED SYNTHETIC RESIN WASTE

FIELD OF THE INVENTION

This invention relates to a method for recovering an uncrosslinked synthetic resin waste, in particular, a styrene resin waste, which is characterized by using a solvent containing one or more oxyisobutyric acid esters.

BACKGROUND OF THE INVENTION

Synthetic resins have been widely used not only in the form of molded articles but also as containers, packages and packing materials for various products including foods and clothes.

Accordingly, manufacturing of a certain product is accompanied by various plastic wastes at various stages, such as in a manufacturing plant, a distribution system, at the user, etc. Currently, various products are manufactured in order to satisfy consumers' great demands and, therefore, the formation of plastic wastes at every stage is inevitable.

The amount of these plastic wastes, as industrial wastes or general wastes, is more and more increasing and it is well known that manufacturers, distributors and local governments are now confronted with a serious problem of the efficient recovery and treatment thereof.

The same situation applies to expanded materials, such as styrol foam (expanded styrene foam). Because of having excellent properties (lightness, compression strength, moldability, etc.), the expanded styrene foam has been widely applied to, for example, food trays. However, expanded styrene foam is stable and bulky, and does not decompose. Thus, it is a serious problem to efficiently recover expanded styrene foam and to dispose the waste portions thereof.

At present, most industrial wastes are buried in the ground by the waste disposal traders or disposed of by some other methods. On the other hand, general wastes are incinerated or buried in the ground in the waste disposal facilities of local governments.

In any event, plastic wastes contaminate the air and underground water and the disposal thereof may create environmental pollution. As a means for solving these problems, there has been proposed a method for recovering plastic wastes wherein the some are dissolved in hydrocarbon solvents (see, JP-A-5-500186(WO91/03515), JP-A-51-28175 and JP-A-6-32938; the term "JP-A" as used herein means an "unexamined published Japanese patent application"). However, this method is disadvantageous for safety and environmental reasons, since the solvents employed therein (i.e., aromatic hydrocarbons and halogenated hydrocarbons, such as xylene, benzene and carbon tetrachloride) are either poisonous, carcinogenic, or are environmentally disadvantageous.

Accordingly, it is serious problem in this technical field to develop a solvent for recovery which causes no problems of toxicity and safety on the human body, is environmentally safe and yet has high dissolving power for plastic wastes.

SUMMARY OF THE INVENTION

An object of the present invention is to provide a method for recovering plastic wastes by using a highly safe solvent which is free from the above-mentioned defects encountered in the conventional methods with the use of aromatic hydrocarbons or halogenated hydrocarbons, wherein the solvent of the present invention comprises non-halogen solvents, forms no substance causing environmental problems, has a high ability to dissolve plastic wastes, has neither toxicity nor any offensive odor, is not accumulated in nature owing to its high biodegradability, and has a relatively high boiling point.

As a result of extensive investigation to develop a method for recovering plastic wastes with the use of a solvent having such preferable properties as described above, the present inventors have successfully found that oxyisobutyric acid esters such as alkyl α-alkoxyisobutyrates, alkyl β-alkoxyisobutyrates and alkyl α-hydroxyisobutyrates satisfy the requirements as the solvent to be used in the recovery method, thus completing the present invention.

Accordingly, the present invention provides a method for recovering an uncrosslinked synthetic resin waste which comprises dissolving the uncrosslinked synthetic resin waste in a solvent containing, as an active ingredient, at least one oxyisobutyric acid ester selected from the group consisting of an alkyl α-alkoxyisobutyrate represented by the formula (1):

an alkyl β-alkoxyisobutyrate represented by the formula (2):

and an alkyl α-hydroxyisobutyrate represented by the formula (3):

wherein $R^1$ and $R^2$ each represent an alkyl group having from 1 to 4 carbon atoms.

BRIEF DESCRIPTION OF THE DRAWING

FIG. 1 is a schematic flow sheet showing an example of the method for recovering a synthetic styrene resin in accordance with the present invention.

DETAILED DESCRIPTION OF THE INVENTION

It is an important point that the solvent used in the method for recovering an uncrosslinked synthetic resin waste of the present invention contains an alkyl oxyisobutyrate. Examples of the oxyisobutyric acid ester include alkyl α-alkoxyisobutyrates (corresponding to formula (1)), such as methyl α-methoxyisobutyrate, ethyl α-methoxyisobutyrate, methyl α-ethoxyisobutyrate and ethyl α-ethoxyisobutyrate; alkyl β-alkoxyisobutyrates (corresponding to formula (2)), such as methyl β-methoxyisobutyrate, ethyl β-methoxyisobutyrate, methyl β-ethoxyisobutyrate and ethyl β-ethoxyisobutyrate; and alkyl α-hydroxyisobutyrates (corresponding to formula (3)), such as methyl α-hydroxyisobutyrate and ethyl α-hydroxyisobutyrate. Taking dissolving power and volatility into consideration, it is particularly preferable to use methyl α-methoxyisobutyrate, methyl β-methoxyisobutyrate, methyl β-ethoxyisobutyrate or methyl α-hydroxyisobutyrate. Moreover, these oxyisobutyrates are excellent in safety. In particular, methyl β-methoxyisobutyrate and methyl α-hydroxyisobutyrate are highly safe compounds, each having an acute toxicity $LD_{50}$ of not less than 5,000 mg/kg (in the case of oral administration to rat).

The alkyl α-alkoxyisobutyrates (corresponding to formula (1)), alkyl β-alkoxyisobutyrates (corresponding to formula (2)) and alkyl α-hydroxyisobutyrates (corresponding to formula (3)) may be used either individually or in combination of two or more thereof. The mixing ratio thereof may be arbitrarily selected.

These oxyisobutyric acid esters represented by formulae (1), (2) and (3) are available as disclosed, for example, in EP-A-429800.

The alkyl α-alkoxyisobutyrates, alkyl β-alkoxyisobutyrates and alkyl α-hydroxyisobutyrates used in the present invention are highly compatible with other general organic solvents, for example, alcohols, esters, ketones, amides and aromatic hydrocarbons. In addition, they exhibit markedly excellent dissolving power for a wide range of polymeric compounds, which include natural resins such as cellulose resins, styrene resins, acrylic resins, vinyl resins, such as vinyl acetate resins and vinyl chloride resins, and synthetic resins, such as polyester resins and polyamide resins. Therefore, the oxyisobutyric acid ester used in the recovery method of the present invention may be employed either alone as a solvent or in the form of a solvent composition together with other organic solvent(s). In the case of the solvent composition, the mixing ratio may be arbitrarily selected. It is preferable, however, that the amount of the oxyisobutyric acid ester in the solvent is 50 to 100% by weight, preferably 70 to 100% by weight and still preferably 80 to 100% by weight, so as to effectively take full advantage of the safety and dissolving power of the oxyisobutyric acid ester.

The other organic solvents, which may be used herein in combination with the oxyisobutyric acid ester, are not particularly restricted, and examples thereof include methanol, ethanol, isopropanol, acetone, methyl ethyl ketone, methyl isobutyl ketone, pyrrolidone, N-methylpyrrolidone, dimethylformamide, dimethylacetamide, methyl acetate, ethyl acetate, butyl acetate, methyl lactate, ethyl lactate, butyl lactate, methyl β-methoxypropionate, ethyl β-ethoxypropionate, propylene glycol monomethyl ether acetate, hexane and limonene. These organic solvents may be used either individually or in combination of two or more thereof.

With regard to the resin which may be treated by the method of the present invention, synthetic styrene resins, polyester resins and acrylic resins are particularly preferred. While not wishing to limit the invention, the styrene content of the resin is preferably 5% or more and more preferably 10% or more. The synthetic styrene resin may be any suitable synthetic styrene resin, so long as it has a styrene skeleton. Examples thereof include modified composite expanded styrene resins, which are excellent in moldability, compression strength and absorption of impact and are thus employed in packing materials and bumper fillers as a cushioning material, ABS resins and AS resins employed as a casing material, and expanded styrene foams discarded as common domestic wastes. Polystyrene and expanded styrene foam are particularly preferred.

The synthetic resin to be recovered by the method of the present invention may be in any suitable form, such as a film, a sheet, a foam or a molded article.

As shown in FIG. 1, the method for recovering an uncrosslinked synthetic resin waste in accordance with the present invention may be carried out, for example, by the following procedure, but is not limited thereto.

As plastic waste recovered as industrial wastes, such as styrene resins (e.g., polystyrene or expanded styrene foam, which had been used as containers, packages and packing materials for various products including foods and clothes) and ABS resins used as a casing material in manufacturers and distributors, is supplied into a grinder 1 and then ground. The ground waste is fed into a dissolution tank 3 by the pneumatic pressure of a blower 2. The dissolution tank 3 is previously charged with a solvent for dissolving the above waste from a solvent tank 10, and the internal temperature thereof is previously regulated to a temperature of about 20° to 100° C. The amount of the solvent used may be about 1.5 to 4 times by weight as much as that of the waste portions. The above wastes fed into the dissolution tank 3 is dissolved in the solvent.

The resin solution thus obtained is passed through a filter 11 to thereby eliminate foreign substances (e.g., muds, food dregs or labels) attached to the plastic wastes recovered. Next, it is fed into a vacuum devolatizing tank 5 (regulated to a temperature of about 150° to 300° C. under reduced pressure of about 4 to 200 mmHg) to evaporate the solvent in the resin solution. On the other hand, the resulting molten resin is withdrawn from the devolatizing tank 5, supplied into a die 7 via a double conduit 6, and then extruded via a nozzle. Thus a stringly molded article is obtained. This stringly molded article is cut into pellets with a cutter 8. Thus a resin pellet is obtained.

The solvent evaporated in the devolatizing tank 5 is supplied into a condenser 9 to obtain a condensate, and the obtained condensate is transported into the solvent tank 10.

After the recovery, the synthetic resin solution may be reused as a resin solution as such. Alternatively, the solvent may be recovered by devolatization under reduced pressure, and then the resin may be recovered in the form of pellets, etc. and reused.

The present invention will now be illustrated in greater detail by way of the following Examples, but should not be construed as being limited thereto.

EXAMPLE 1

A jacket 4 of a dissolution tank 3 (effective capacity: 20 l) as shown in FIG. 1 was preliminarily set to 100° C. 6 kg of a polystyrene waste (manufactured by Denki Kagaku Kogyo Kabushiki Kaisha) was supplied into a grinder 1 and the ground polystyrene waste was then fed into the dissolution tank 3 by the pneumatic pressure of a blower 2. Then 10 kg of methyl β-methoxyisobutyrate was supplied thereto under stirring. Thus a polystyrene solution was formed within about 10 minutes.

The polystyrene solution thus obtained was passed through a filter 11 to thereby eliminate insoluble foreign substances (e.g., muds, food dregs or labels, which were attached to the plastic wastes) from the solution. Next, it was fed into a vacuum devolatizing tank 5 (15 cm in diameter, 100 cm in height), which had been regulated to a temperature of 230° C. and a degree of vacuum of 30 Torr, over about 3 hours. The molten polystyrene thus obtained was withdrawn from the devolatizing tank 5, supplied into a die 7 via a double conduit 6, and then extruded via a nozzle. Thus a stringy molded article having a high transparency was obtained. This stringy molded article was cut into pellets with a cutter 8. Thus 5.8 kg of an almost colorless polystyrene pellet similar to a virgin material were obtained.

The evaporated solvent was condensed with a condenser 9 and the obtained condensate was transported into a solvent tank 10 and reused as the solvent.

EXAMPLE 2

The same procedure as in the above Example 1 was repeated, except for using methyl α-hydroxyisobutyrate as a solvent.

EXAMPLE 3

The same procedure as in the above Example 1 was repeated, except for using methyl α-methoxyisobutyrate as a solvent.

EXAMPLE 4

The same procedure as in the above Example 1 was repeated, except for using a mixture of methyl β-methoxyisobutyrate with ethyl lactate as a solvent.

EXAMPLE 5

The same procedure as in the above Example 1 was repeated, except for using an ABS resin (manufactured by Mitsubishi Rayon Co., Ltd.) as a plastic waste.

EXAMPLE 6

The same procedure as in the above Example 1 was repeated, except for using a polyester resin as a plastic waste.

EXAMPLE 7

The same procedure as in the above Example 1 was repeated, except for using an acrylic resin as a plastic waste.

COMPARATIVE EXAMPLE 1

The same procedure as in the above Example 1 was repeated, except for using xylene as a solvent.

COMPARATIVE EXAMPLE 2

The same procedure as in the above Example 1 was repeated, except for using xylene as a solvent and an ABS resin as a plastic waste.

The results of the above Examples 1 to 5 and Comparative Examples 1 to 2 are summarized in Tables 1 and 2 below.

TABLE 1

| Run No. | Solvent (10 kg) | Plastic Waste | | | Amount of Pellets Recovered (kg) | Recovery (%) |
| --- | --- | --- | --- | --- | --- | --- |
| Example 1 | methyl β-methoxyisobutyrate | 100% | polystyrene | 6.0 kg | 5.8 | 96.7 |
| Example 2 | methyl α-hydroxyisobutyrate | 100% | polystyrene | 5.1 kg | 4.8 | 94.1 |
| Example 3 | methyl α-methoxyisobutyrate | 100% | polystyrene | 5.8 kg | 5.5 | 94.8 |
| Example 4 | methyl β-methoxyisobutyrate ethyl lactate | 80% 20% | polystyrene | 5.2 kg | 5.0 | 96.2 |
| Example 5 | methyl β-methoxyisobutyrate | 100% | ABS resin | 5.0 kg | 4.9 | 98.0 |

TABLE 2

| Run No. | Solvent (10 kg) | Plastic Waste | | Amount of Pellets Recovered (kg) | Recovery (%) |
| --- | --- | --- | --- | --- | --- |
| Example 6 | methyl β-methoxyisobutyrate | 100% | polyester resin | 5.8 kg | 5.6 | 96.6 |
| Example 7 | methyl β-methoxyisobutyrate | 100% | acrylic resin | 5.9 kg | 5.7 | 96.6 |
| Comp. Example 1 | xylene | 100% | polystyrene | 4.8 kg | 4.5 | 93.8 |
| Comp. Example 2 | xylene | 100% | ABS resin | 1.2 kg | 1.0 | 83.3 |

According to the present invention, synthetic styrene resins (expanded styrene foam) etc., which are commonly employed, stable and bulky, and do not decompose, can be recovered through dissolution in a solvent at a efficiency comparable or even superior to that achieved by using xylene, i.e., a solvent typically employed in the art. The solvents employed in the method of the present invention have the following advantages:

(1) they contain no halogens and thus cause no environmental problems;
(2) they have neither toxicity nor any offensive odor and thus can be handled safely;
(3) they are not accumulated in nature due to their high biodegradability;
(4) they have improved handling properties and safety due to their high boiling point and their high flash point; and
(5) they are highly compatible with many organic solvents.

While the invention has been described in detail and with reference to specific embodiments thereof, it will be apparent to one skilled in the art that various changes and modifications can be made therein without departing from the spirit and scope thereof.

What is claimed is:

1. A method for recovering an uncrosslinked synthetic resin waste selected from the group consisting of synthetic styrene resin, polyester resin and acrylic resin, comprising the steps of dissolving the uncrosslinked synthetic resin waste in a solvent to form a resin solution, and recovering said solvent from said resin solution to form a molten resin, said solvent comprising, as an active ingredient, an effective amount of at least one oxyisobutyric acid ester selected from the group consisting of: an alkyl α-alkoxyisobutyrate represented by the formula (1):

an alkyl β-alkoxyisobutyrate represented by the formula (2):

and an alkyl α-hydroxyisobutyrate represented by the formula (3):

wherein $R^1$ and $R^2$ each represent an alkyl group having from 1 to 4 carbon atoms.

2. The method as claimed in claim 1, wherein said solvent further comprises at least one compound selected from the group consisting of methanol, ethanol, isopropanol; acetone, methyl ethyl ketone, methyl isobutyl ketone, pyrrolidone, N-methylpyrrolidone, dimethylformamide, dimethylacetamide, methyl acetate, ethyl acetate, butyl acetate, amyl acetate, methyl lactate, ethyl lactate, butyl lactate, methyl β-methoxypropionate, ethyl β-ethoxypropionate, propylene glycol monomethyl ether acetate, hexane and limonene.

3. The method as claimed in claim 2, wherein said oxyisobutyric acid ester is one selected from the group consisting of methyl α-methoxyisobutyrate, ethyl α-methoxyisobutyrate, methyl α-ethoxyisobutyrate, ethyl α-ethoxyisobutyrate, methyl β-methoxyisobutyrate, ethyl β-methoxyisobutyrate, methyl β-ethoxyisobutyrate, ethyl β-ethoxyisobutyrate, methyl α-hydroxyisobutyrate and ethyl α-hydroxyisobutyrate.

4. The method as claimed in claim 1, wherein said oxyisobutyric acid ester is one selected from the group consisting of methyl α-methoxyisobutyrate, ethyl α-methoxyisobutyrate, methyl α-ethoxyisobutyrate, ethyl α-ethoxyisobutyrate, methyl β-methoxyisobutyrate, ethyl β-methoxyisobutyrate, methyl β-ethoxyisobutyrate, ethyl β-ethoxyisobutyrate, methyl α-hydroxyisobutyrate and ethyl α-hydroxyisobutyrate.

5. The method as claimed in claim 1, wherein said uncrosslinked synthetic resin waste is synthetic styrene resin.

6. The method as claimed in claim 5, wherein said synthetic styrene resin has a styrene content of at least 5%.

7. The method as claimed in claim 1, wherein said oxyisobutyric acid ester is present in said solvent in an amount of 50 to 100% by weight.

8. The method as claimed in claim 1, wherein said solvent recovery step comprises devolatizing said resin solution under reduced pressure.

9. The method as claimed in claim 1, further comprising the step of pelletizing said molten resin.

10. The method as claimed in claim 1, further comprising the step of grinding said synthetic resin waste prior to said dissolving step.

11. The method as claimed in claim 1, further comprising the step of filtering said resin solution.

* * * * *